United States Patent [19]

Mano et al.

[11] Patent Number: 4,855,728
[45] Date of Patent: Aug. 8, 1989

[54] METHOD AND APPARATUS FOR CONVERTING DISPLAY DATA FORM

[75] Inventors: Hiroyuki Mano, Yokohama; Tsuguji Tachiuchi, Odawara; Kiyoshige Kinugawa, Chiba; Shinji Tanaka, Kodaira, all of Japan

[73] Assignees: Hitachi, Ltd.; Hitachi Microcomputer Engineering Ltd., both of Tokyo, Japan

[21] Appl. No.: 56,128

[22] Filed: Jun. 1, 1987

[30] Foreign Application Priority Data

May 30, 1986 [JP] Japan .................................. 61-123421

[51] Int. Cl.[4] ............................................. G09G 3/36
[52] U.S. Cl. ..................................... 340/805; 340/784; 340/745
[58] Field of Search ............... 340/784, 781, 802, 805, 340/811, 744, 745, 748; 358/59, 241

[56] References Cited

U.S. PATENT DOCUMENTS

| | | | |
|---|---|---|---|
| 4,604,617 | 8/1986 | Morozumi | 340/805 |
| 4,660,030 | 4/1987 | Maezawa | 340/805 |
| 4,679,043 | 7/1987 | Morokawa | 340/805 |

*Primary Examiner*—Gerald L. Brigance
*Attorney, Agent, or Firm*—Antonelli, Terry & Wands

[57] ABSTRACT

A data converting system converts CRT display data into display data for another display unit such as a liquid crystal display unit by use of a memory. The system includes a data load controller which selects one segment of data out of two segments of data in the CRT display data successively while changing the segment position to be selected alternately in every two frame scanning periods so that the CRT display data for one complete picture is written into the memory in two frame scanning periods, i.e., a segment is written into the memory once for every two adjacent segments. Display data is read out of the memory in the data form conformable to the other display unit.

7 Claims, 13 Drawing Sheets

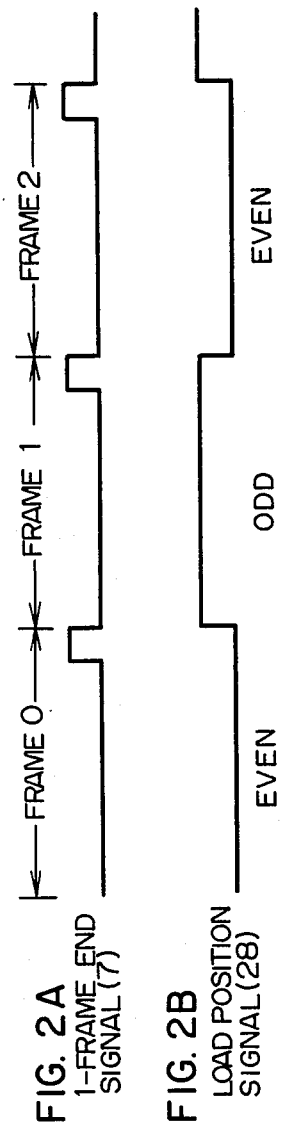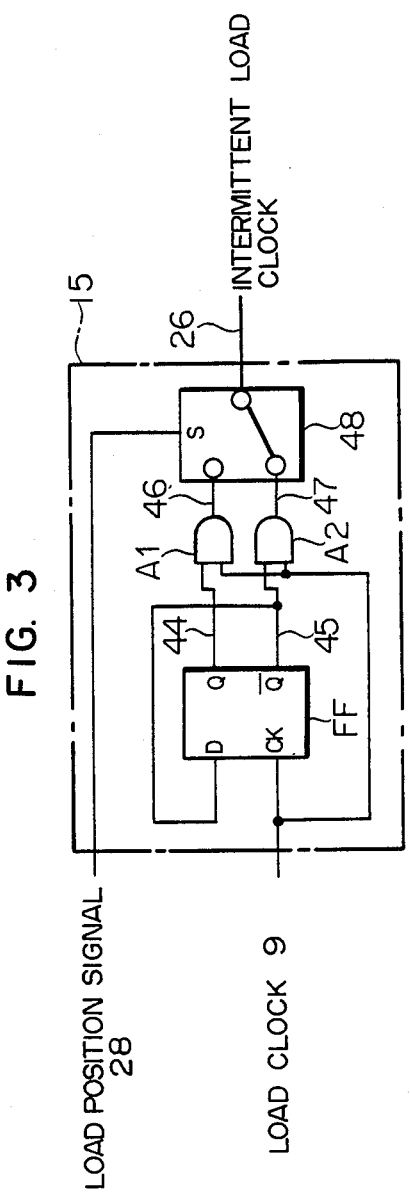
FIG. 2A
1-FRAME END SIGNAL (7)
FIG. 2B
LOAD POSITION SIGNAL (28)
FIG. 3

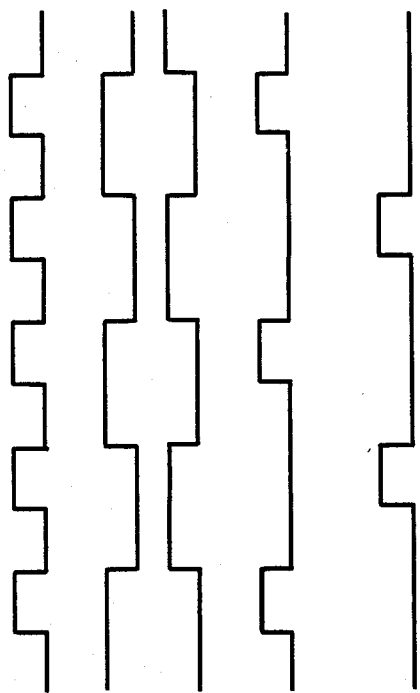
FIG. 4A  LOAD CLOCK (9)
FIG. 4B  EVEN-NUMBER SIGNAL (44)
FIG. 4C  ODD-NUMBER SIGNAL (45)
FIG. 4D  EVEN-NUMBER CLOCK (46)
FIG. 4E  ODD-NUMBER CLOCK (47)

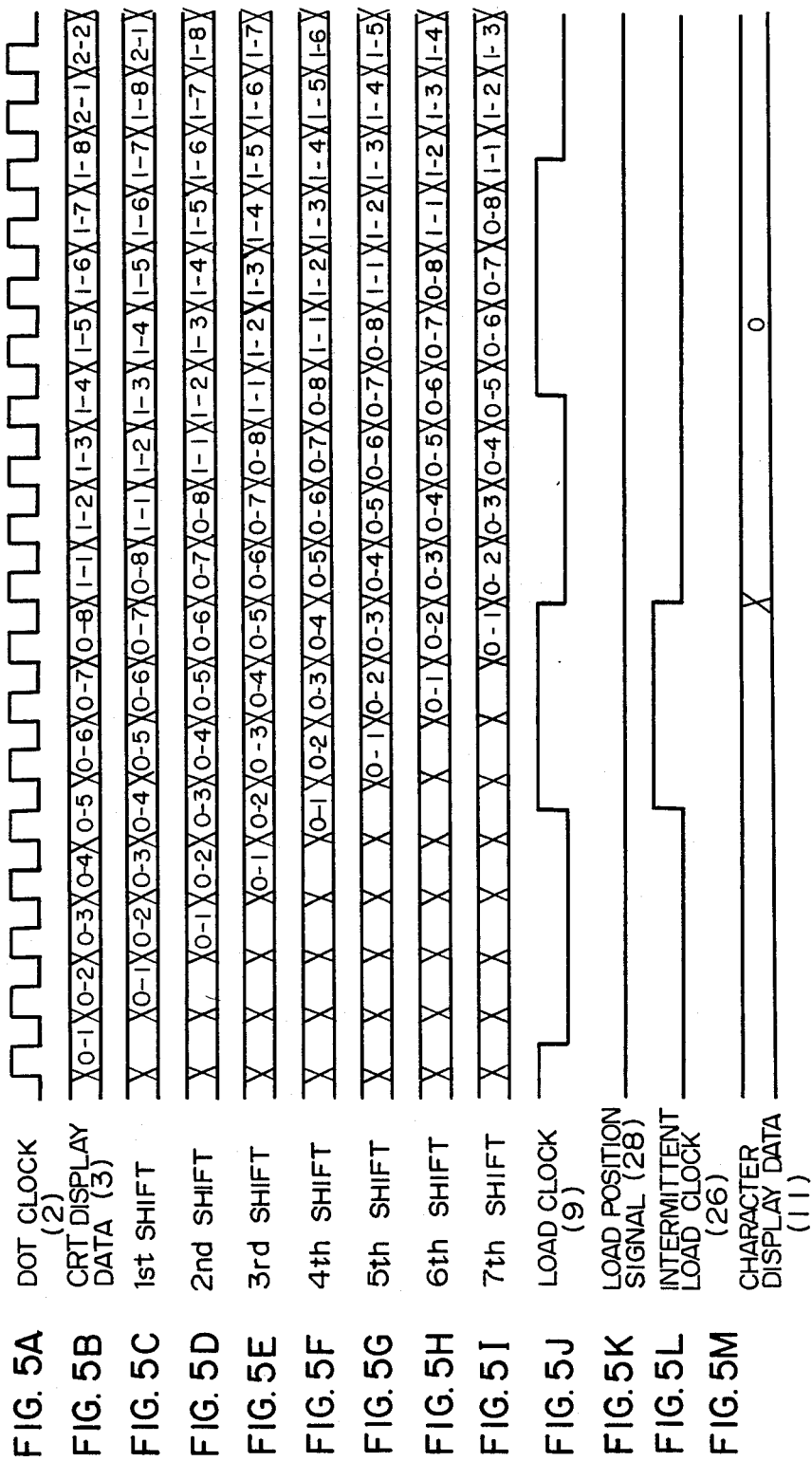

CRT DISPLAY DATA (3)

7th SHIFT

INTERMITTENT LOAD CLOCK (26)

CHARACTER DISPLAY DATA (11)

FIG. 7A CRT DISPLAY DATA (3)

FIG. 7B 7th SHIFT

FIG. 7C INTERMITTENT LOAD CLOCK (26)

FIG. 7D CHARACTER DISPLAY DATA (11)

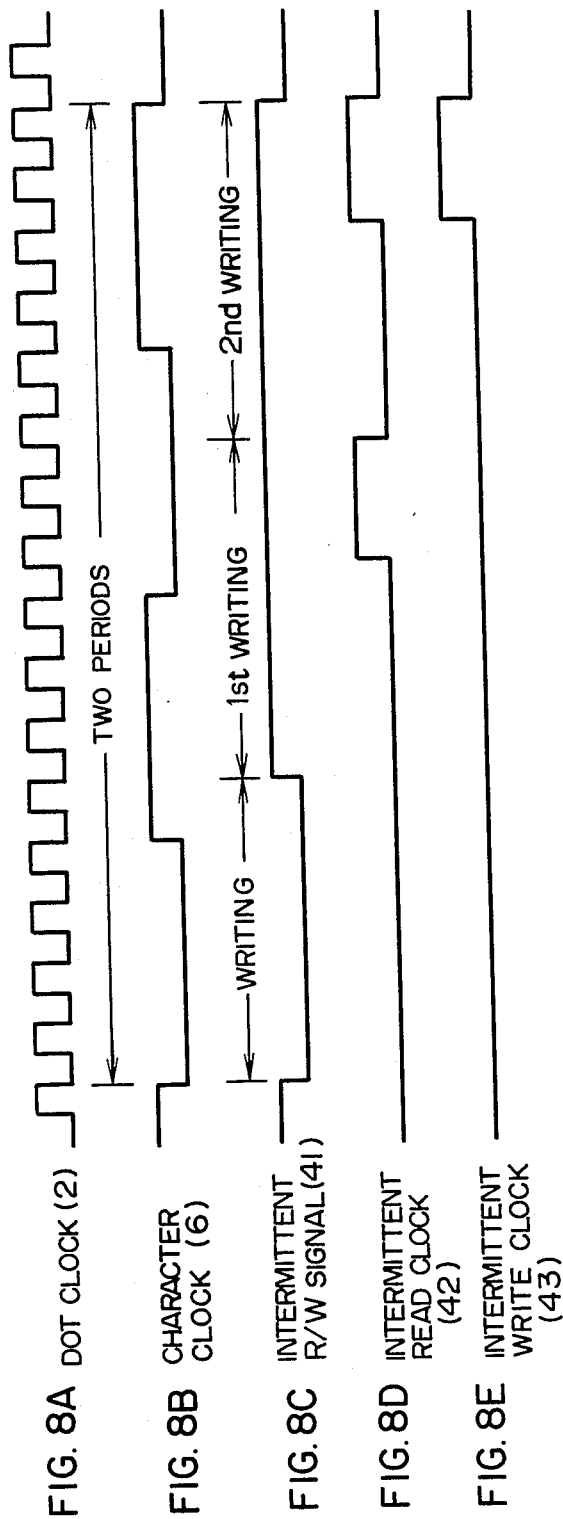

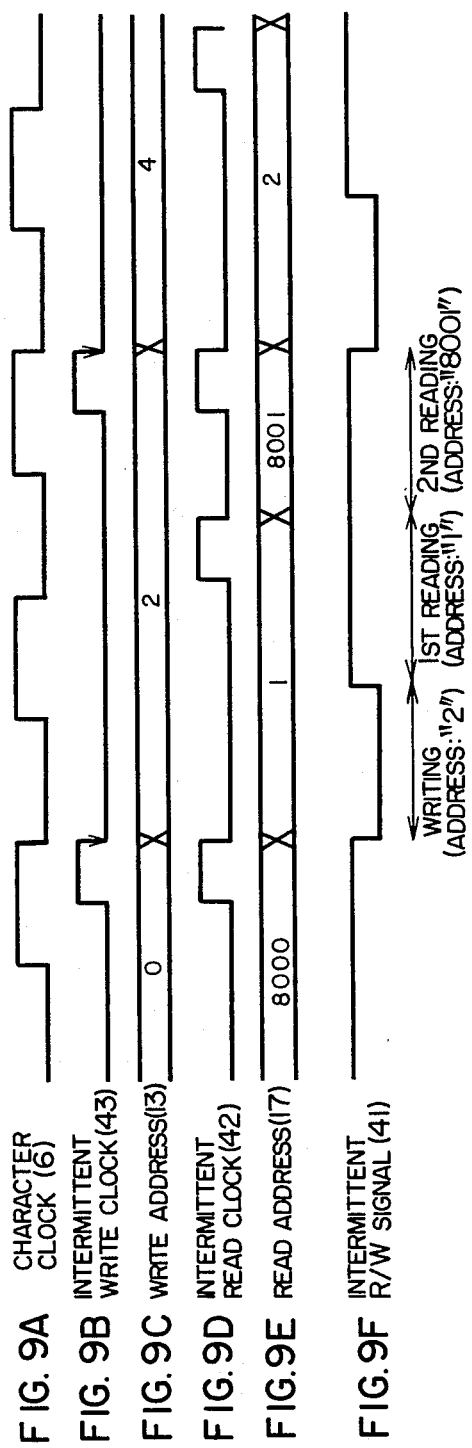

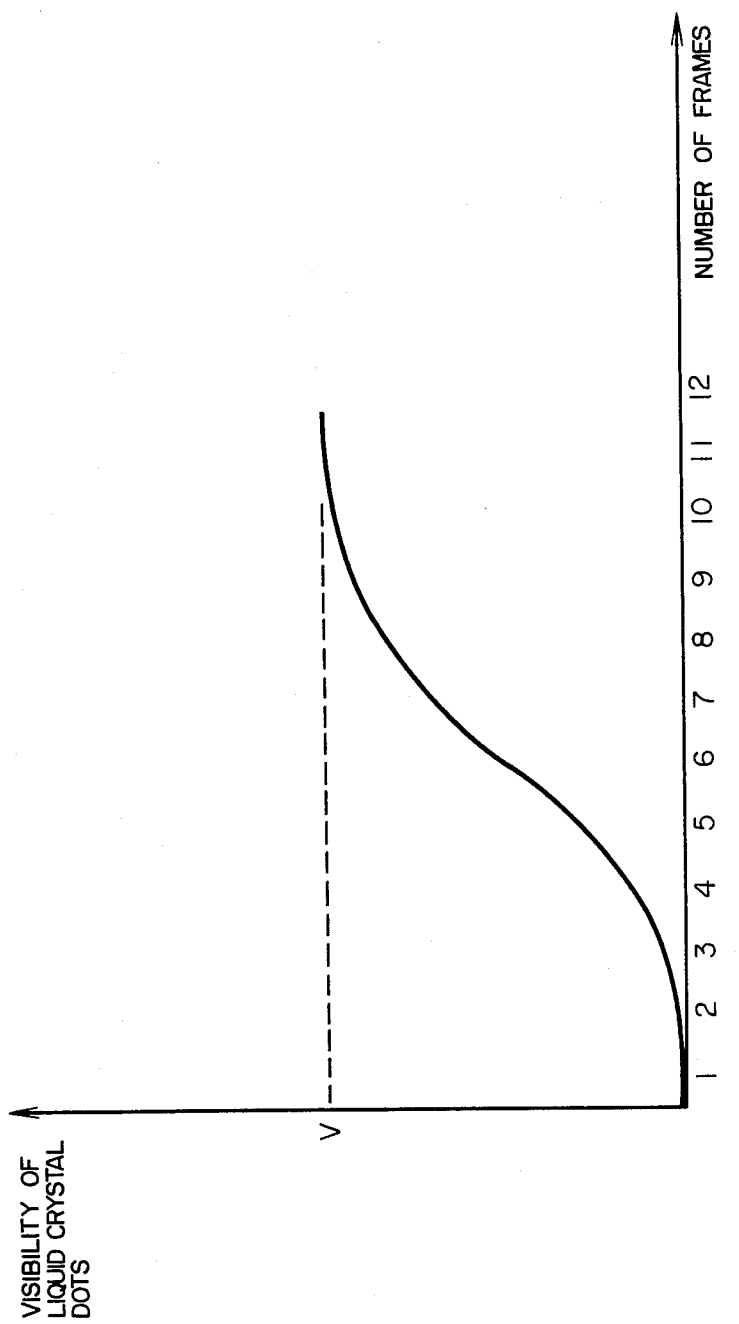

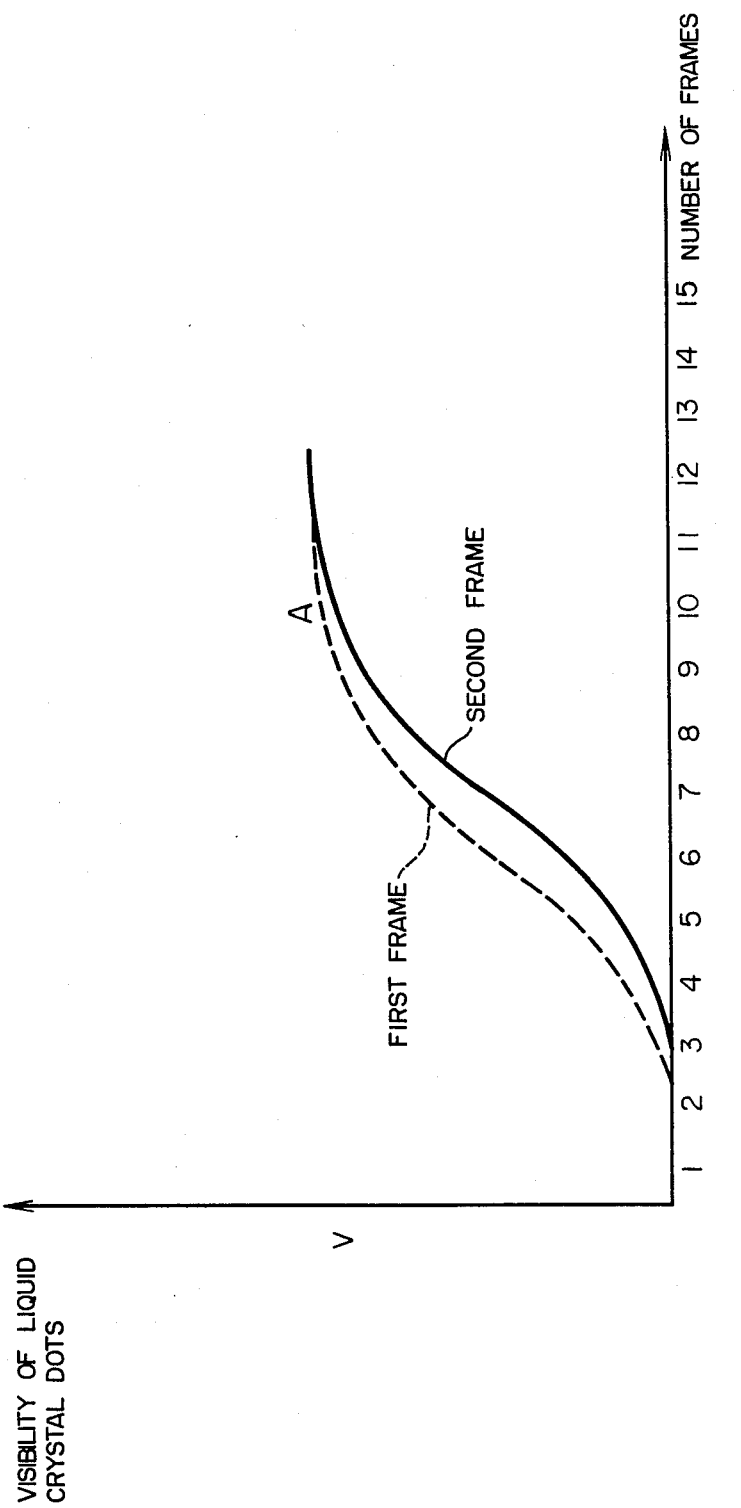

METHOD AND APPARATUS FOR CONVERTING DISPLAY DATA FORM

BACKGROUND OF THE INVENTION

This invention relates to a method and apparatus for converting display data for use among different types of display units, and particularly to a display control method and apparatus for converting display data oriented to a CRT (cathode ray tube) display unit into display data for a display unit of a different type.

In recent years, various types of display units are used for personal computers and the like, and these include CRT display units, liquid crystal display (LCD) units and plasma display units, etc. These different types of display units are controlled differently by a host computer in displaying the same data even though the pixel arrangement is identical. To cope with this situation, there have been developed LSI devices for converting CRT display data into liquid crystal display data, as exemplified by an LSI device SED 1340F manufactured by Suwa Seikosha Co., Ltd., Japan. This LSI device is simply added to a conventional CRT display unit, and it allows CRT display data to be displayed on a LCD panel. The device temporarily stores CRT display data in its buffer memory, then converts the data into LCD display data when it reads the data out of the buffer memory. Such a data converting LSI device is useful in extensive application fields for allowing large CRT oriented display data to be displayed on a small LCD panel.

FIG. 11 shows a typical display system using the above-mentioned data converting LSI device. The arrangement includes a CRT display unit 30 which produces display signals including CRT display data 3, dot clock 2 indicating the dot period of the display data 3, and display period signal 1 indicating whether or not the display data 3 is to be displayed, a cathode ray tube (CRT) 31 on which the display data 3 is displayed, a data converter 29 which converts CRT display data into LCD display data, a LCD panel 32 having its entire screen divided into upper and lower screens where LCD upper-screen data 23 and LCD lower-screen data 24 provided by the data converter 29 are displayed, respectively, and a display data memory 21 for storing the CRT display data 3. The liquid crystal panel is technically limited in size, and a large display screen is generally constructed using two panels forming the upper and lower screens.

FIG. 12A shows the screen of CRT 31 on which the CRT display data 3 is displayed, and FIG. 12B shows the LCD panel 32 on which the LCD upper-screen display data and LCD lower-screen display data are displayed.

FIG. 13 shows in block diagram the conventional data converter 29. Shown by 4 is a timing generator which receives the display period signal 1 and dot clock 2 and produces various timing signals. For example, 6 is a segment clock signal indicating the 1-segment period made up of eight dots, 7 is a one frame end signal indicating that the CRT scanning operation for one frame has been completed, 8 is a R/W signal for setting the read mode or write mode for the display data memory 21, and 9 is a load clock signal for fetching the CRT display data 3 as a segment string. Shown by 10 is a serial-to-parallel converter which converts the CRT display data 3 in a serial form into parallel data 11 for each multi-bit segment, 12 is a write means which receives the display data 11 and produce a write address 13 and write data 14 to be stored in the display data memory 21, 16 is a read means which produces a read address 17 to retrieve data 18 from the display data memory 21 so that it is displayed on the LCD panel, and 19 is an address switching circuit which selects the write address or read address in response to a "high" or "low" state of the R/W signal 8 to provide the address signal 20 for the display data memory 21. Shown by 25 is LCD display data retrieved by the read means 16, and 22 is an LCD display data output means which receives the LCD display data 25 and produces LCD upper-screen display data 23 and LCD lower-screen display data 24.

Receiving the CRT display data 3, the CRT 31 displays segments of data in addresses "0", "1", ..., "79", "80", "81", ..., "7999", "8000", ..., "15920", ..., and "15999" sequentially from the top left to the bottom right on the screen, as shown in FIG. 12A. In contrast, the LCD panel 32 displays segments of LCD upper-screen display data 23 in addresses "0" through "7999" in the order from the top left to the bottom right of the upper screen and segments of LCE lower-screen display data 24 in addresses "8000" through "15999" in the order from the top left to the bottom right of the lower screen, as shown in FIG. 12B. It is necessary for the LCD panel 32 to receive the LCD upper-screen display data 23 and LCD lower-screen display data 24 concurrently.

Because of different manners of supplying display data to the CRT and LCD panel, the data converter 29 in conjunction with the display data memory 21 converts the CRT display data 3 into the LCD upper-screen display data 23 and LCD lower-screen display data 24. The operation of the data converter 29 will be explained in more detail. In FIG. 13, the serial CRT display data 3 is converted to units of a segment by the serial-to-parallel converter 10 to form the data 11. The converter 10 shifts the serial CRT display data 3 to align the bit position and sends out a segment of data 11 in response to the falling edge of the load clock 9 produced by the timing generator 4. Consequently, the serial CRT display data 3 is divided into segments of parallel data, and the data 11 is fed to the write means 12. The write means 12 appends a sequential address to the segment of data 11 in response to the segment clock 6, and produces the write data 14 and write address 13. The character clock 6 is a signal delayed by one clock period from the load clock 9. The write means 12 responds to the segment clock 6 to count the address, thereby producing the write address 13, while directly sending out the segment of data 11 as write data 14. The read means 16 responds to the segment clock 6 to produce the read address 17, thereby retrieving data 18 from the display data memory 21. Since the LCD panel needs to be supplied with display data for the upper and lower screens concurrently, the read address 17 is issued in such a manner that address "0" for the upper screen is produced first, which is immediately followed by address "8000" for the lower screen. The write address 13 and read address 17 are received by the address switching circuit 19 for selection in accordance with the R/W signal 8, and the selected memory address signal 20 is delivered to the display data memory 21. Namely, with the R/W signal 8 being "low", a write address 13 is given to the display data memory 21, and a portion of write data 14 is written in the display data memory 21 at the rising edge of the R/W signal 8. With the R/W signal 8 being "high", a read address 17 is given to the memory 21, and a portion of data stored in that address is read out as read data 18. The display data read means 16 latches the retrieved data 18 at the falling edge of the character clock 6 and releases it as LCD display data 25. In order to provide display data for the upper and lower screens of the LCD panel, the LCD display data output means 22 latches a portion of 8-bit LCD display data 25 as 4-bit data of address "0" in the upper screen and a 4-bit data of address "8000" in the lower screen, and then releases the data in two parts as an LCD upper-screen display data 23 and LCD lower-screen display data 24. In this manner, the CRT display data 3 is stored in the display data memory 21 by the write means 12, and it is retrieved for LCD display by the read means 16. The write and read operations take place in one segment period, i.e., 8-dot period, or 4-dot period for each operation. In consequence, the CRT display data 3 is converted into LCD display data by the data converter 29.

The foregoing prior art system implements writing and reading on one segment period, and therefore it becomes difficult to practice a large display panel for which the dot clock 2 needs to have a higher frequency. For example, a display panel of 640-by-400 dots requires a dot clock of 21 MHz (in the case of personal computer model B16/EX manufactured by Hitachi, Ltd., Japan), and the period of reading and writing is 190 ns (i.e., 1/21 MHz×4). In consideration of a marginal period for read/write switching, an expensive memory with access time below 100 ns is necessary. In the future, when the size of display panel expands to 720-by-512 dots, 1024-by-494 dots, 1120-by-720 dots, and even larger, the dot clock will exceed 30 MHz, and conversion to LCD data will become difficult due to the restriction of access time to memory means.

SUMMARY OF THE INVENTION

An object of this invention is to provide a method and apparatus for converting display data oriented to one type of display unit into display data for another type of display unit.

Another object of this invention is to provide a display control method and apparatus capable of readily converting display data oriented to a large-screen display unit into display data for another type of small-screen display unit.

Still another object of this invention is to provide a display control method and apparatus capable of converting display data oriented to a CRT display unit into display data for another type of display unit through the process of writing display data into a memory and retrieving the data from the memory with sufficient marginal period for the read/write switching.

In order to achieve the above objectives, according to one aspect of this invention, when display data of one display unit is written into the memory, display data for one frame is loaded in a scanning period for N frames. Namely, the control takes place such that a segment of data out of N segments of data is loaded in the memory selectively and in this case the segment position for selection among N segments is changed cyclically in every N scanning periods. This control scheme provides a sufficient marginal timing relationship in writing display data for a large-screen display into the memory means, whereby display data oriented to a large-screen display unit can be converted and displayed on a display unit of another type without using an expensive memory.

According to another aspect of this invention, a device for converting first display data oriented to a first display unit, e.g., CRT unit, into second display data for a display unit of another type, e.g., liquid crystal display unit or plasma display unit, by use of a memory comprises a data load means which receives the first display data and implements serial-to-parallel conversion for the data to form segments of data, write means for writing the segments into the memory, means for reading out data from the memory in the form of the second display data suitable for the other display unit, load control means which operates on the data load means to load a segment of data selectively out of N (N is a natural number larger than one) segments of data supplied continuously while changing the segment position among N segments cyclically in every N scanning period, and write control means which operates on the write means to write segments of data into the memory once in every N segments of data. A segment of data is defined here to be a set of dot data written or read out of the memory in parallel, which is typically 8-dot data, and also can be 4-dot data, 12-dot data, 16-dot data, and the like.

BRIEF DESCRIPTION OF THE DRAWINGS

FIGS. 2A and 2B are waveform diagrams showing the operation of the circuit arrangement shown in FIG. 1;

FIG. 3 is a schematic diagram showing a specific circuit arrangement of the data load means in FIG. 1;

FIGS. 4A to 4E are waveform diagrams showing the operation of the circuit shown in FIG. 3;

FIGS. 5A to 5M are waveform diagrams used to explain the operation of loading display data according to the embodiment shown in FIG. 1;

FIGS. 7A to 7D are waveform diagrams used to explain the operation of loading display data for odd-numbered frames according to the embodiment shown in FIG. 1;

FIGS. 8A to 8E are waveform diagrams used to explain the operation of intermittent reading and writing of the display data memory according to the embodiment shown in FIG. 1;

FIGS. 9A to 9F are waveform diagrams explaining the intermittent reading and writing operations in relation with the address of the display data memory according to the embodiment shown in FIG. 1;

FIGS. 10A and 10B are graphs used to explain the response speed of LCD display;

DESCRIPTION OF THE PREFERRED EMBODIMENT

An embodiment of this invention will now be described with reference to the drawings. In this embodiment, incoming CRT display data is received at a rate of one segment of data out of two segments of data at a time so that display data for one frame is loaded into the display data memory in a 2-frame scanning time length.

Figure 1:
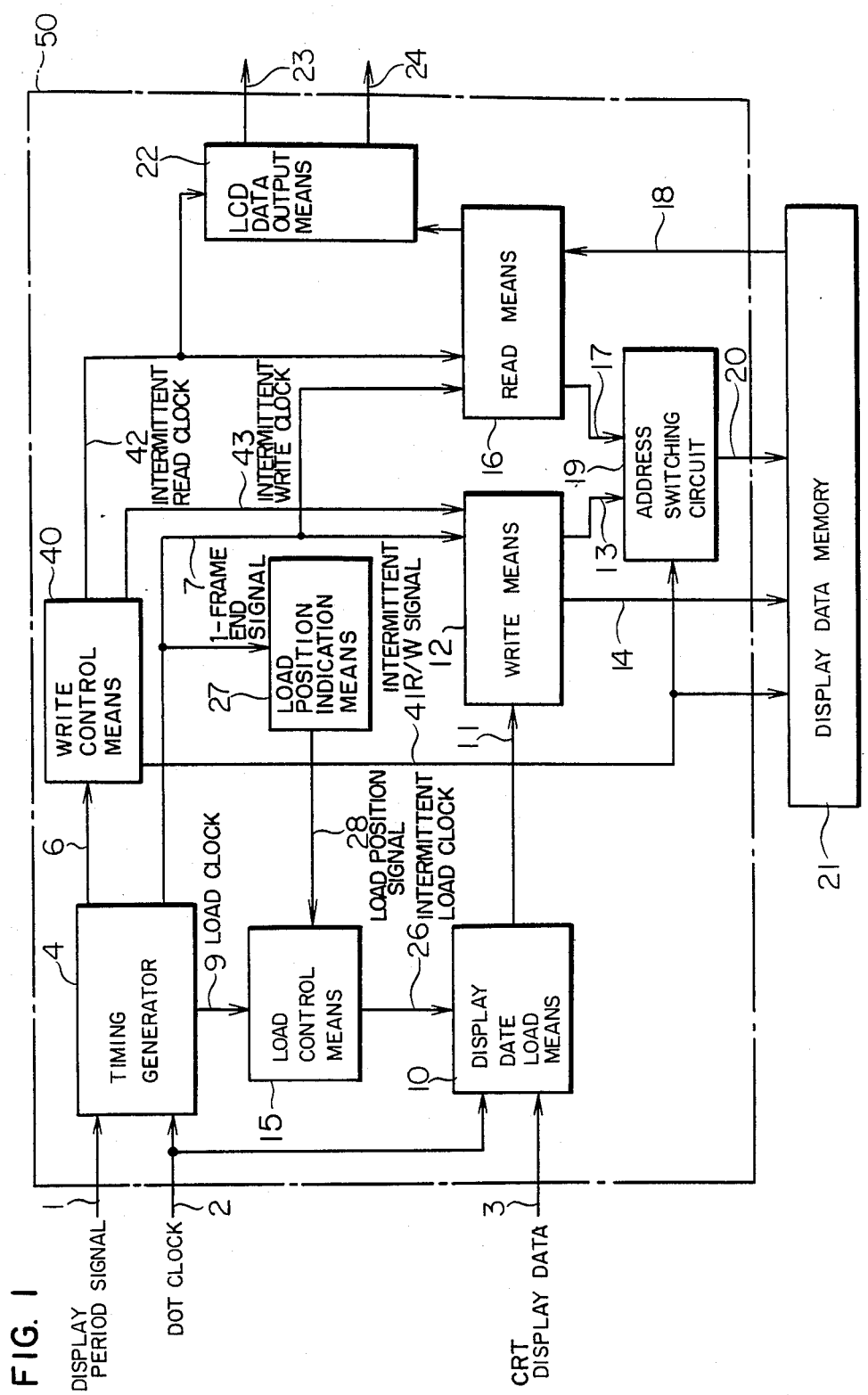
FIG. 1 is a block diagram of the display data converter embodying the present invention.
Figure 6A:
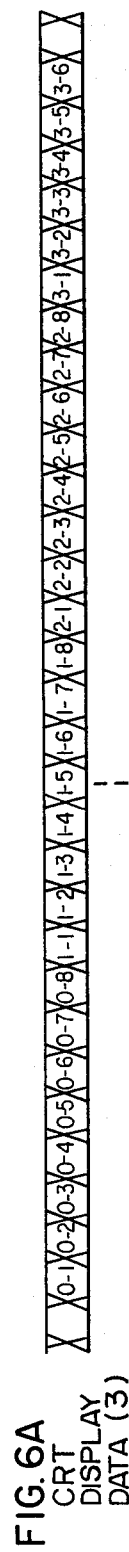
FIGS. 6A to 6D are waveform diagrams used to explain the operation of loading display data for even-numbered frames according to the embodiment shown in FIG. 1.
Figure 6B:
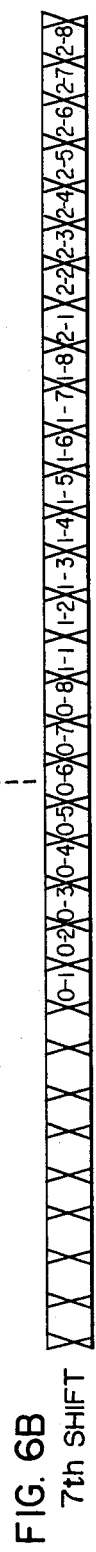
Figure 6C:
Figure 6D:
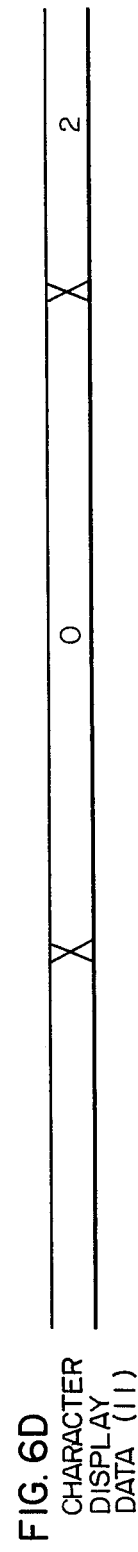
Figure 11:
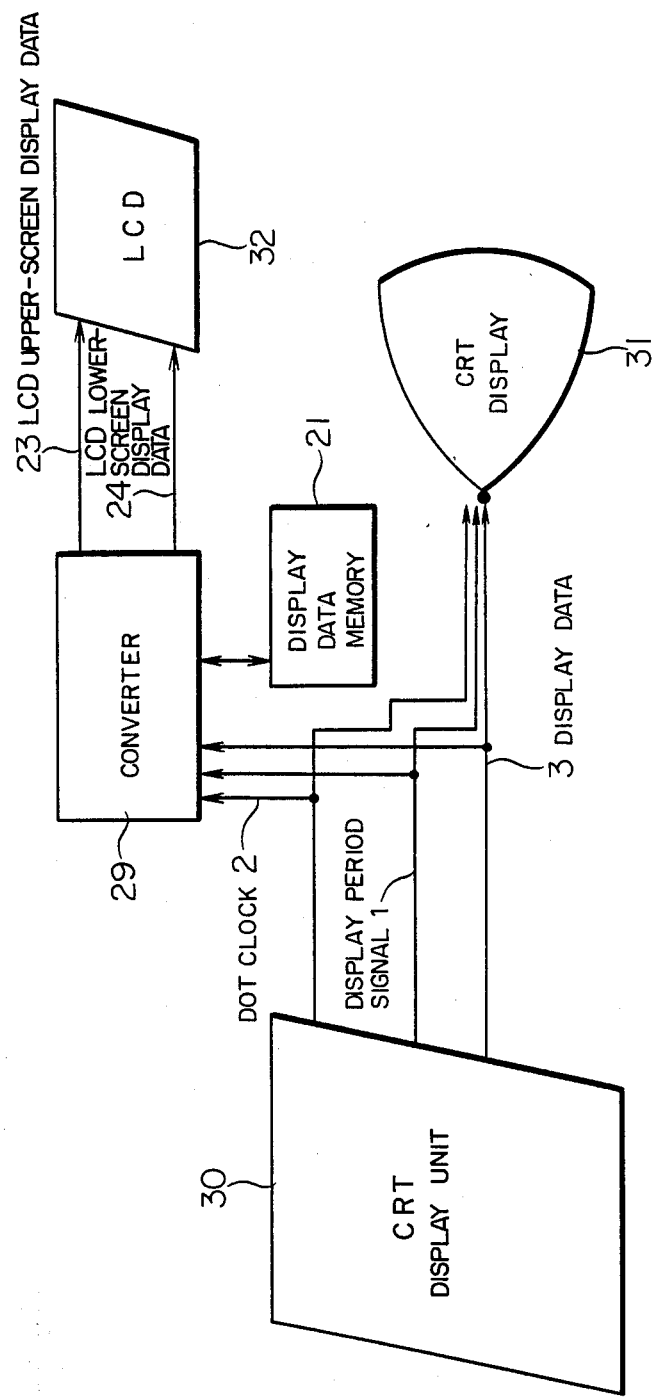
FIG. 11 is a block diagram showing the overall display system to which the present invention is applied.
Figure 12A:
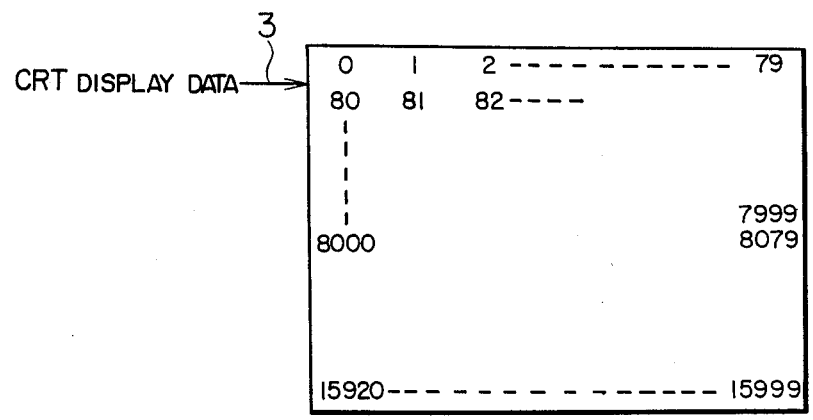
FIGS. 12A and 12B are diagrams showing display data in relation with scanning operation on the CRT display screen and LCD display panel, respectively.
Figure 12B:
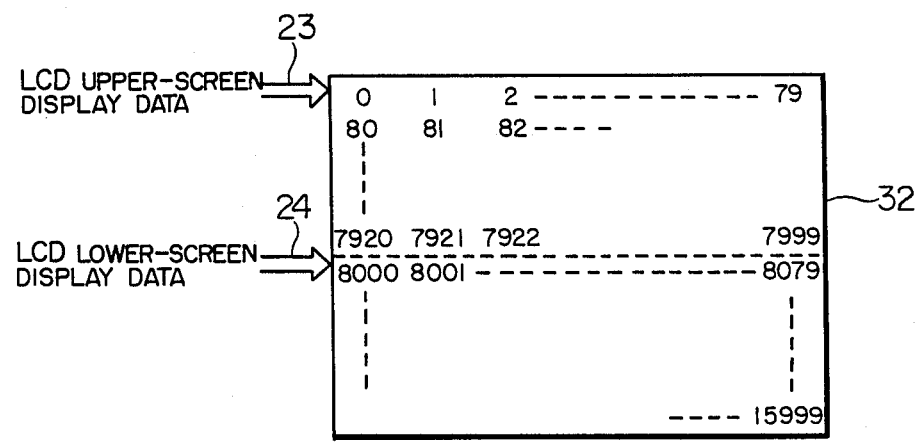
Figure 13:
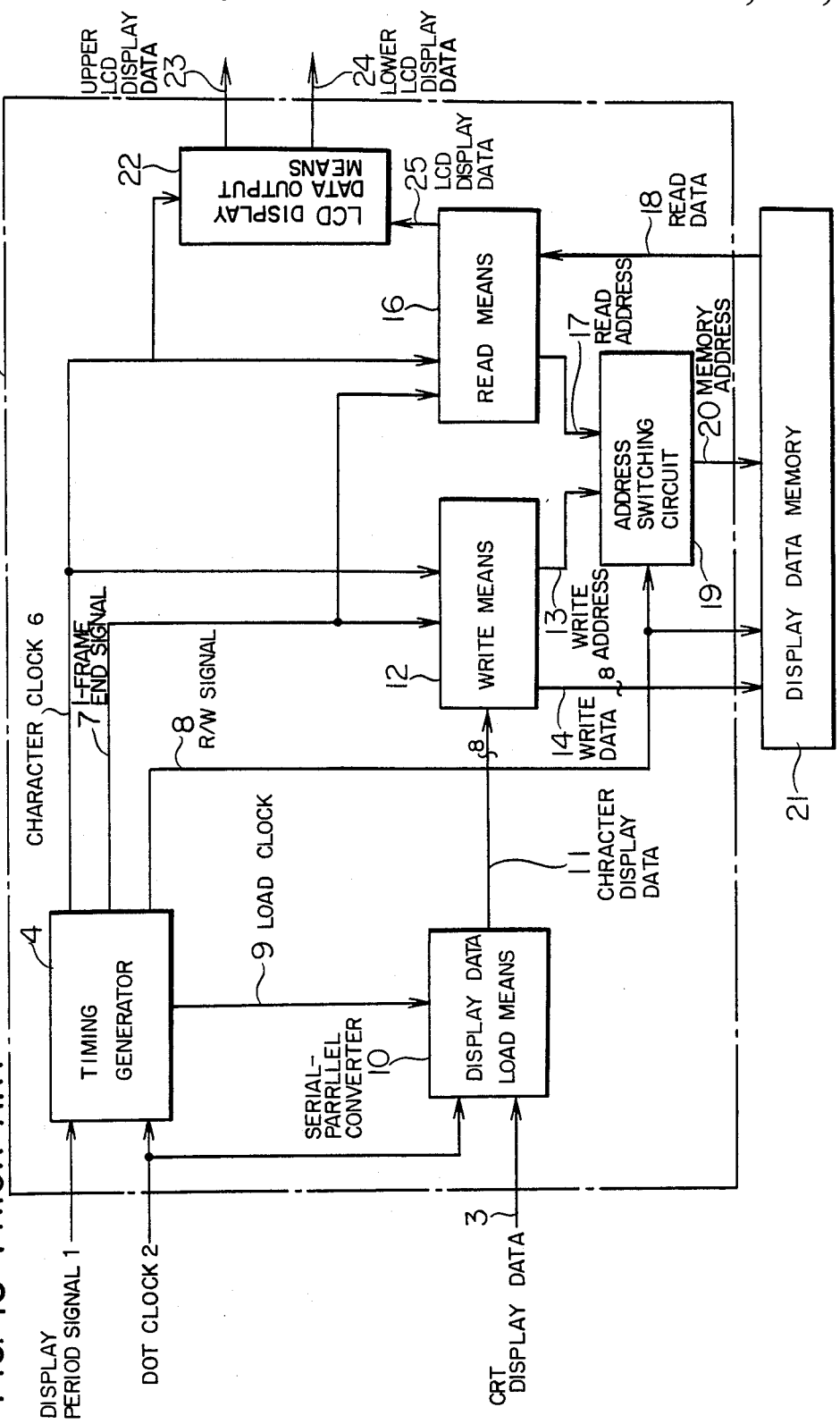
FIG. 13 is a block diagram showing the circuit arrangement of the conventional display data converter.

FIG. 1 shows in block diagram the inventive data converter 50, in which functional blocks identical to those shown in FIG. 13 are referred to by the same symbols. Shown by 27 is a load position indicating means which counts the field end signal 7 to determine whether the currently scanning frame is an even-numbered frame or odd-numbered frame and produces a load position indicating signal 28 which designates the even-numbered segment position or odd-numbered segment position for loading CRT display data 3. Shown by 15 is a load control means which receives the load clock 9 and extracts only even-numbered clock pulses or only odd-numbered clock pulses depending on the load position indication signal 28, and 26 is an intermittent load clock produced by the load control means 15 as mentioned above. Shown by 40 is a write control means which operates on the write means 12 and read means 16 to write display data once into the display data memory 21 and thereafter read display data twice out of the memory 21, and the write control means 40 produces an intermittent read clock 42, intermittent write clock 43 and intermittent R/W signal 41. The load position indicating means 27 produces the load position indication signal 28 which signifies an even-numbered frame at "low" level or an odd-numbered frame at "high" level, in response to the frame end signal 7 indicating that CRT display data 3 for one frame has been transferred, as shown in FIGS. 2A and 2B.

The load control means 15 is arranged as shown in FIG. 3, and it consists of a D-type flip-flop FF, AND gates A1 and A2, and a clock selection circuit 48. The load control means 15 produces an even-number signal 44 (FIG. 4B) indicating that the data load clock 9 shown in FIG. 4A is at the even-numbered position and an odd-number signal 45 (FIG. 4C) indicating that the clock 9 is at the odd-numbered position, and after the logical-product operation with the data load clock 9 it produces an even-numbered clock 46 (FIG. 4D) and odd-numbered clock 47 (FIG. 4E). These clocks 46 and 47 are selected by the clock selecting circuit 48, which produces an intermittent clock 26 by selecting the even-numbered clock 46 when the load position indication signal 28 is "low", or the odd-numbered clock 47 when the signal 28 is "high".

Due to the attribute of the intermittent load clock 26 supplied to the display data load means 10, the block falls at the position where the "0" segment has been entered with the load position indication signal 28 being "low", while it does not fall at the entry of the "1" segment, as shown in FIGS. 5A to 5M. In response to the intermittent load clock 26, segments of data in addresses "0", "2" and so on at even-numbered positions, or segments of data in addresses "1", "3" and so on at odd-numbered positions are loaded by the display load means 10 as display data 11, as shown in FIGS. 6 and 7. Since the display data segments 11 is loaded once in two consecutive data, as opposed to the conventional system, the display data write means 12 implements the write operation once in every second period of the segment clock 6. In contrast, the display data read means 16 implements the read operation once in every period of the segment clock 6. Namely, the write operation takes place once and thereafter the read operation takes place twice in every second period of the segment clock 6 as shown in FIGS. 8A to 8E.

In order that the above operations are carried out by the display data write means 12, display data read means 16 and address switching circuit 19, the write control means 40 produces the intermittent R/W signal 41 (FIG. 8C), intermittent read clock 42 (FIG. 8D) and intermittent write clock 43 (FIG. 8E).

Since these signals need to be in phase with the display data 11, they are produced by the write control means 40 at a timing after the data has been loaded in response to the intermittent load clock 26 in both cases of an even-numbered frame and odd-numbered frame for the write operation. Reading and writing of the display data memory 21 by the intermittent R/W signal 41, intermittent read clock 42, and intermittent write clock 43 take place such that a segment of data with the write address 13 being "2" is written in two periods of segment clock 6 and subsequently two portions of data at read addresses "1" and "8001" are read out as shown in FIGS. 9A–9F. The retrieved data is received by the LCD display data output means 22 as LCD display data 25, and then the data is sent out as the LCD upper-screen display data 23 and LCD lower-screen display data 24.

Consequently, CRT display data, i.e., even-numbered segments of data at even-numbered frames and odd-numbered segments of data at odd-numbered frames, are loaded into the display data memory 21. Accordingly, display data for one complete picture is loaded in a 2-frame period. As a result, rewriting of LCD display data is retarded by one frame, but in this case the LCD panel has a response speed which takes 10 to 12 frames before active dots reach a visible state V as shown in FIG. 10A. Namely, the LCD panel does not reach the visible state V for active dots when the signal indicative of the state of display is absent for a length of 10–12 frames. On this account, the comparison of data loaded in the first frame with data loaded in the second frame reveals that there is no substantial difference in the state of data (visibility) loaded in the second frame from the data load in the first frame at the time point when the first-frame data becomes visible, as shown by point A in FIG. 10B.

In the case of personal computers, loading of display data is at most 1 Hz (rewriting once in 30 frames), and there is no problem in loading display data for one complete picture in two frames. An even faster operation is expected in scrolling of a display, in which case rewriting of data takes place in 60 ms (4 frames), but the LCD panel cannot follow this speed, and therefore there is no difference between the display data loading system at a rate of one picture in one frame and the system of one picture in two frames. Even in the case of a CRT display, it is very difficult for a person to read segments of data during a scroll at such a fast rewriting speed, and therefore disappearance of segments during a scroll on the LCD display conceivably does not matter.

As described above, by loading CRT display data for one complete picture in a 2-frame period, the inventive system requires only one write operation and two read operations in two periods of segment clock 6 as opposed to the conventional system which requires two write operations and two read operations in two segment clock periods, and it provides a marginal period of 1/[dot clock frequency]×4÷3 second for each read operation and write operation.

Some LCD panels have response speeds slower than that shown in FIG. 10A, and in these cases display data for one complete picture can be loaded in a 3-frame period without influence on the display. This allows one write operation and three read operations in three segment periods, and it provides a marginal period of 1/[dot clock frequency]×8÷4 second for each write operation and read operation. In the above-mentioned explanation, the display data in the display apparatus is based on the non-interlace system. However, the present invention is applicable to the display apparatus using the display data based on the interlace system.

According to the present invention, CRT display data for one complete picture is loaded into the display data memory in scanning periods for N pictures, thereby allowing a longer read/write access time for the display data memory, and in consequence it becomes possible to load display data for a large CRT screen sized by 640-by-400 dots or more so that the data is converted into LCD display data.

We claim:

1. A method of converting input display data organized into frames of data oriented to a cathode ray tube display apparatus into converted display data for display by a panel type display apparatus, comprising the steps of:

forming said input display data for a frame of data into multi-bit segments through serial-to-parallel conversion;

writing one segment of data out of each group of N segments of said frame of input display data (where N is a natural number larger than one) into display data memory means during each frame scanning time by successively selecting during each N successive frame scanning times a different corresponding segment of data in successive groups of N segments of said input display data; and retrieving each segment of data from said display data memory means to form said converted display data.

2. A display data converting method according to claim 1, wherein N is equal to 2 and the selection of said one segment of data from said N segments of data is alternated in successive frame scanning times.

3. An apparatus for converting input display data organized into frames of data oriented to a cathode ray type video display apparatus into converted display data for display by a panel type video display apparatus by use of a memory means, said converting apparatus comprising:

means for implementing a serial-to-parallel conversion for said input display data to form segments of data;

means for selectively extracting a corresponding segment of data out of each of a plurality of groups of N (N is a natural number larger than one) segments of data in each of N successive frame scanning times and for writing said extracted segment of data into said memory means; and means for retrieving each extracted segment of data from said memory means to form said converted display data.

4. A display data converting apparatus according to claim 3, wherein said conversion means comprises data load means for implementing said serial-to-parallel conversion of said input display data to form a series of data segments, means for writing said extracted data segments into said memory means, load control means for controlling said data load means to load selectively said one segments of data out of N characters of data in each group of N segments by changing the segment position of the segment to be selected in said N groups of segments cyclically in every N frame scanning time, and write control means for controlling said write means to write said extracted segment data into said memory means.

5. An apparatus for converting first display data organized into frames of data oriented to a display apparatus of a cathode ray tube type into second display data for display by a panel type display apparatus comprising:

timing generation means responsive to a display period signal and dot clock signal for said first display data for producing a segment clock signal, a one frame end signal and a load clock signal;

data load means connected to receive said first display data and said dot clock signal for effecting serial-to-parallel conversion for said first display data to form segments of data for loading;

load control means responsive to said load clock signal and said one frame completion signal for controlling said data load means to load one segment of data out of each of a plurality of groups of N segments of data successively while changing the segment position within the groups of the one segment to be selected from said N segments of data cyclically in successive N frame scanning periods;

write means connected to receive said segment data loaded by said data load means and said one frame end signal for writing said loaded data into a display data memory; and control means responsive to said segment clock signal for controlling said write means to write said segments of data into said memory means.

6. A display data converting apparatus according to claim 5, wherein said panel type display apparatus comprises a liquid crystal panel display unit.

7. A display data converting apparatus according to claim 6 further comprising read means for retrieving said segments of data as said second display data from said display data memory.

* * * * *